Figure 1:

3,241,947
ENCAPSULATED PARTICULATE FERTILIZER
Donald C. Young, Fullerton, Calif., assignor to Union Oil Company of California, Los Angeles, Calif., a corporation of California
Filed Oct. 16, 1962, Ser. No. 230,958
8 Claims. (Cl. 71—60)

This invention relates to solids comprising ammonium nitrate and calcium sulfate. In one embodiment, this invention relates to ammonium nitrate compositions useful as plant nutrients and soil amendments to correct acidity, alkalinity and salinity of soils. In another embodiment, this invention relates to solid compositions comprising a central core of ammonium nitrate with an encapsulating homogeneous solid phase containing ammonium nitrate and calcium sulfate in various stages of hydration.

The compositions of my invention are very useful to correct improper soil conditions such as excess acidity. Improper balances in the soil are conventionally corrected by the application of various soil amendments such as calcium nitrate, sulfur or lime. The application of these soil amendments, however, has generally been performed independently of the fertilization of the soil, thus duplicating the work of application.

It is an object of this invention to provide a solid fertilizer comprising ammonium nitrate and a soil amendment which will correct for salinity and/or acidity or alkanity of the soil.

It is also an object of this invention to provide a coating for ammonium nitrate prills which resists deliquescence of the ammonium nitrate.

Other and related objects will be apparent from the following disclosure.

I have found that when calcium sulfate, ammonium nitrate and at least one-half mol of water per mol of calcium sulfate are admixed and exposed to a temperature in excess of about 220° F., a highly endothermic reaction occurs to form a reaction product which is, apparently, a solid hydrated complex ammonium nitrate-calcium sulfate salt. This solid is hard, dense and has a very high degree of resistance to caking. The amount of calcium sulfate which can be incorporated into the solid phase can be varied from trace quantities to about equal molecular parts with the ammonium nitrate, as desired.

The compositions prepared with low proportions of calcium sulfate, e.g., about 0.1 to about 10 weight percent are, of course, substantially ammonium nitrate. I have discovered that these solids, however, have a greatly increased resistance to moisture degradation than exhibited by ammonium nitrate prills or ammonium nitrate prills admixed with various anti-caking additives such as clays because these solids have a moisture "reservoir" which permits the adsorption of large quantities of water before dissolution of the nitrate crystal phase.

The ammonium nitrate-calcium sulfate complex salts which contain greater than about 10 weight percent calcium sulfate are very desirable fertilizers since they contain a source of plant nutrients, i.e., nitrogen and sulfur as well as plant amendments, i.e., calcium to correct salinity or acidity of the soil, and sulfur in the form of sulfate to correct alkalinity of the soil. Additionally, the relatively insoluble gypsum is changed to a more soluble form by the treatment thereby rendering its nutrients and soil amendments more available.

In general, compositions containing up to equal mol proportions of calcium sulfate and ammonium nitrate can be obtained if desired. These materials are prepared from the reaction of a calcium sulfate salt with ammonium nitrate. Generally, an excess amount of the calcium salt can be used, the excess salt being separated from the solid product. In this manner, solids containing up to about 60 weight percent calcium sulfate and about 35 weight percent ammonium nitrate can be obtained. In general, the total plant nutrients of the solids can be between about 36 and 45 weight percent, with between about 12.4 and about 34 weight percent nitrogen, between about 1 and about 18 percent calcium and between about 1 and about 14 percent sulfur.

As previously mentioned, it is necessary to provide at least one-half mol of water per mol of calcium sulfate to be reacted. Therefore, when anhydrous calcium sulfate is used, this amount of water is also added. Calcium sulfate has several stages of hydration, however, and the various hydrated forms can also be used such as the hemihydrate (plaster of Paris) or the dihydrate (gypsum). The use of these hydrated salts, of course, obviates the need to add water.

Because the calcium sulfate also dilutes the ammonium nitrate, the complex salt of my invention has a greatly decreased sensitivity to detonation and is safer to handle than untreated ammonium nitrate. Despite its decreased detonation characteristic in the unadulterated form, the absorptivity of the calcium sulfate coating provides an ammonium nitrate solid which can be sensitized quite readily by the addition of a hydrocarbon.

The compositions can be obtained by several methods. In the preferred method, ammonium nitrate prills obtained by conventional prilling of an ammonium nitrate meld are placed in a rotating drum together with the desired amount of gypsum and the admixture is heated to the necessary reaction temperature, between about 220° and about 250° F. Upon reaching the reaction temperature, there occurs an extremely rapid endothermic reaction with the expulsion of water from the admixture. This reaction is accompanied by the disappearance of the gypsum powder from the admixture and the production of a hard dense solid particle.

Figure 2:
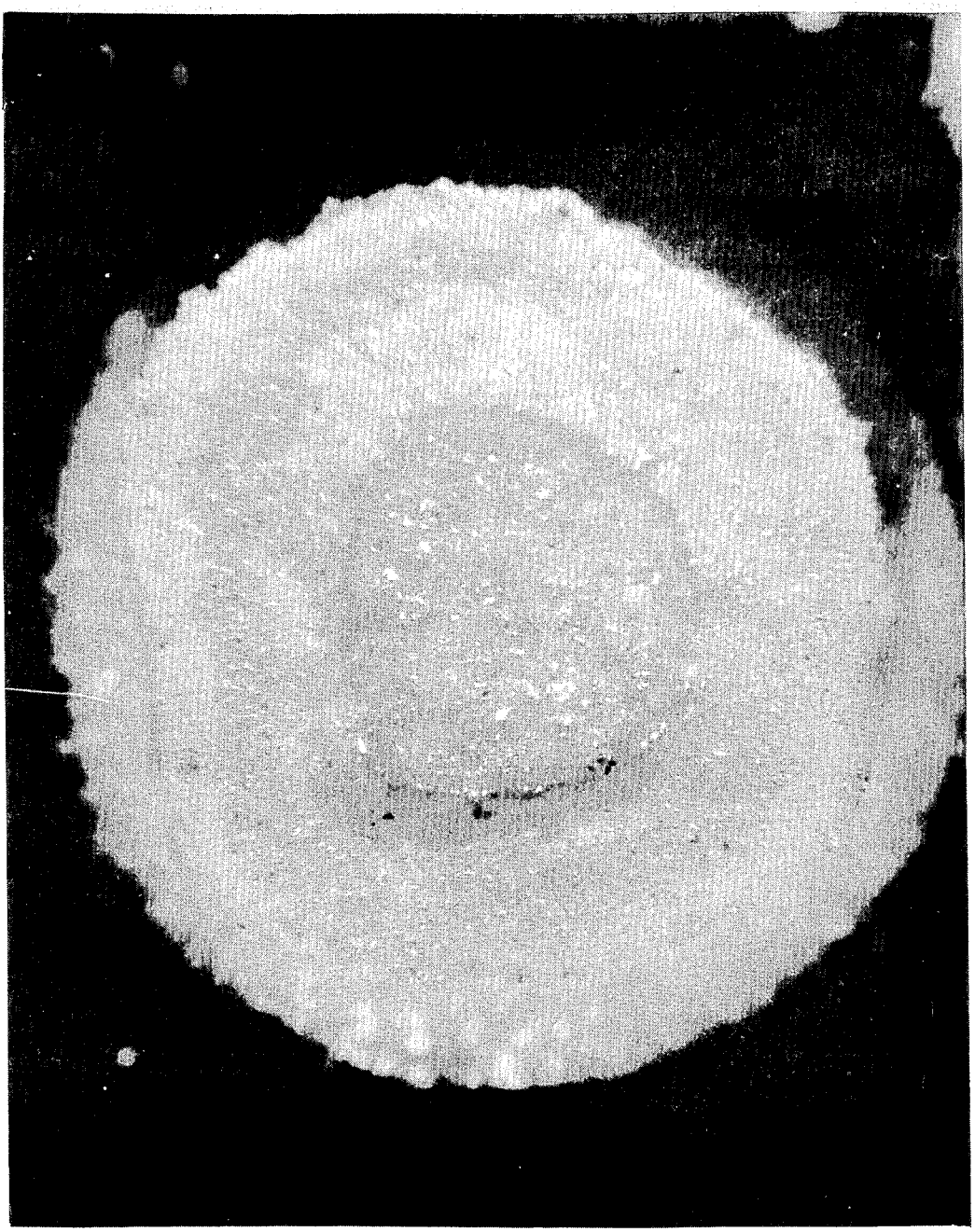

FIGURES 1 and 2 are microphotographs of the solids of my invention. FIGURE 1 shows a cross-section of an untreated ammonium nitrate prill while FIGURE 2 is a photograph of cross-sectioned solid product and an ammonium nitrate prill. As apparent in FIGURE 2, the resulting particles comprise a core of ammonium nitrate enveloped by a complex ammonium nitrate-calcium sulfate reaction product and an outer layer consisting essentially of gypsum which adheres tightly to the solid prill. Thermogravimetric measurements on this reaction indicate that a mol weight of ammonium nitrate reacts with a mol weight of gypsum to expel one and one-half mols of water and form a complex salt. The X-ray diffraction pattern of the solid reaction product shows that the calcium sulfate exists as the anhydrite, the hemihydrate and the dihydrate.

The thickness of the envelopment depends entirely upon the relative proportions of the two reactants, i.e., ammonium nitrate and gypsum. With relatively low amounts of gypsum, about 0.1 to about 10 weight percent of the total, the envelope is relatively thin, yet imparts a moisture resistance to the ammonium nitrate prills. As mentioned, the solid phase of the envelope is the complex calcium sulfate-ammonium nitrate salt in equal molecular proportions.

The compositions of my invention can also be obtained by the addition of the desired amount of gypsum to an ammonium nitrate melt prior to its cooling and prilling or granulation. The addition of gypsum to the ammonium nitrate prills results in the occurrence of an endothermic reaction between the gypsum and ammonium nitrate with the expulsion of water. The resultant reaction product can be cooled to below its solidification point, and the resultant solid crushed and ground to the desired degree of fineness. If desired, the ammonium nitrate-calcium sulfate crude product can also be prilled in a conventional ammonium nitrate prilling tower to obtain prills of the product. The solid products obtained in this embodiment contain the calcium sulfate uniformly distributed throughout the solid particle in contrast to the solids obtained in the preferred method, which have an interior core of ammonium nitrate encapsulated by an ammonium nitrate-calcium sulfate solid phase and, finally, an exterior gypsum surface.

While I do not wish to be bound by any theory as to the mechanism or nature of this endothermic reaction, I believe that the calcium sulfate forms a complex hydrate salt with equal molecular proportions of ammonium nitrate upon expulsion of about one and one-half mol of water per mol of gypsum. This endothermic reaction occurs at about 220° to about 250° F., below the dehydration temperature of gypsum, about 262° F. I have attempted to cause similar reactions to occur with other hydrated and anhydrous salts without success, such as calcium chloride, monoammonium phosphate, diammonium phosphate, ammonium sulfate, calcium carbonate, potassium carbonate, potassium chloride, and anhydrous calcium sulfate. In one of these instances was there any indication of an endothermic reaction such as encountered with gypsum and ammonium nitrate, and in all instances the reactants remained substantially unchanged by the heating.

My invention will now be illustrated by the following examples:

EXAMPLE 1

A thermogravimetric analysis was performed on separate samples of gypsum, ammonium nitrate and equal molecular proportions of gypsum and ammonium nitrate. This analysis was performed in a thermogravimetric balance by placing a 0.1 gram sample in a weighted crucible elastically suspended in the furnace of the apparatus. A heating rate of one degree centigrade per minute was applied and the loss in weight of the sample (detected by movement of the crucible's suspension means) was plotted against the temperature of the sample.

The gypsum sample, when heated, exhibited a constant dehydration rate from about 100° C. to about 160° C. when it reached the anhydrous state by loss of its two moles of hydrated water.

The ammonium nitrate exhibited no detectible loss in weight when heated up to about 180° C.

The combination of ammonium nitrate-gypsum exhibited a more rapid loss in water than did the gypsum sample until a sharp break occurred in the curve at 132° C. At this point, the total loss in weight corresponded to a loss of about one and one-half moles of water per mol of gypsum. Thereafter, the sample gradually lost water until an anhydrous state was reached.

EXAMPLE 2

A metal drum was equipped with three internal baffles and mounted to rotate about its axis. Into the drum was placed 200 grams of ammonium nitrate prills. Thereafter 200 grams of powdered gypsum were added. It was observed that the powdered gypsum deadened the sound of the ammonium nitrate prills crashing against the metal wall of the drum. The drum was heated at the rate of about 3° F. per minute by a bank of infrared lights while the temperature of the solids in the drum was determined by a thermocouple placed within the solid bed. Upon reaching a temperature of about 220° F., the temperature of the solids dropped very rapidly to about 150° F. within 3 seconds. With this abrupt endotherm, the powdered gypsum solid phase disappeared and the resultant solid product again clattered on the wall of the drum.

The heating was discontinued and the solids permitted to cool to room temperature. The solids had increased about 50 percent in diameter and a microphotograph of the cross-sectioned solid appears as FIGURE 2. This figure, previously described, clearly shows separate crystal phases; an interior core of ammonium nitrate surrounded by two ammonium nitrate-calcium sulfate crystal phases and a final outer phase of gypsum. A cross-section of untreated ammonium nitrate is shown in FIGURE 1. From these photographs it is apparent that the prescribed method forms a new solid phase of ammonium nitrate and calcium sulfate. X-ray diffraction studies on the solid reveals that the calcium sulfate is present in at least three forms; the anhydrite, the hemihydrate and the dihydrate (gypsum).

The preceding was repeated with use of calcium chloride, mono-ammonium phosphate, diammonium phosphate, ammonium sulfate, calcium carbonate, potassium carbonate, potassium chloride and anhydrous calcium sulfate in lieu of the gypsum, however, no reaction was observed and no new solid phase was formed.

EXAMPLE 3

A beaker of 100 grams ammonium nitrate was heated to about 390° F. (above its melting point). To the resultant melt was added 100 grams of powdered gypsum. Immediately upon addition of the gypsum there occurred a sharp endotherm and the melt temperature fell to 300° F. The gypsum powder disappeared and, upon cooling, a single homogeneous solid phase was obtained. This solid was crushed to yield granules having a hard surface. No trace of gypsum powder was observed in the solid phase prior to or after crushing.

The preceding examples are intended solely for illustration and are not to be unduly limiting of my invention which is set forth in the following claims.

I claim:

1. The treatment of solid ammonium nitrate that comprises admixing particles of said solid ammonium nitrate with a solid calcium sulfate hydrate salt, heating the admixed solids to a temperature above about 220° F. but below the melting point temperature of said ammonium nitrate to cause an endothermic reaction between said solids, terminating said heating when said reaction occurs and recovering a solid composition having a core comprising said ammonium nitrate and an encapsulating layer of the product of said reaction.

2. The method for coating solid ammonium nitrate particles with a hard and dense surface having anti-caking properties that comprises (1) admixing solid particles comprising ammonium nitrate with a hydrate salt of calcium sulfate to obtain a mixture containing from about 0.1 to about 60 weight percent of said calcium sulfate, (2) heating the admixed solids to a temperature above about 220° F. but below the melting point temperature of said ammonium nitrate to cause an endothermic reaction between said admixed solids and thereby produce said coated ammonium nitrate solid and (3) removing said coated solid ammonium nitrate particles from said heating step upon completion of said reaction as the product of said method.

3. The method for producing an improved fertilizer composition comprising ammonium nitrate and calcium sulfate that comprises (1) introducing solid particles of ammonium nitrate and a hydrate salt of calcium sulfate into a drum to obtain a mixture containing from about 0.1 to about 60 weight percent of said calcium sulfate, rotating said drum about its axis to thoroughly admix said solids, (2) heating said admixed solids in said drum to raise the temperature of said solids to between about 220° and 262° F. and thereby cause a reaction between said hydrate salt of calcium sulfate and ammonium nitrate to produce said improved solid composition and (3) discharging said improved solid composition from said drum, said improved solid comprising an ammonium nitrate core coated with a hard dense capsule of the reaction product of said reaction.

4. The treatment of ammonium nitrate in solid form to prepare a solid particle fertilizer having an ammonium nitrate core encapsulated by a solid state reaction product of ammonium nitrate and a hydrate salt of calcium sulfate that comprises:
  (1) admixing solid particles of said ammonium nitrate with a powdered calcium sulfate hydrate salt to obtain a mixture containing from about 0.1 to about 60 weight percent of said calcium sulfate salt;
  (2) heating said admixed solids to a temperature between 220° F. and the melting point of said ammonium nitrate to thereby initiate an endothermic reaction between said admixed solids; and
  (3) recovering from said heating step said solid particle fertilizer having an ammonium nitrate core encapsulated by the solid reaction product of ammonium nitrate and said hydrate calcium sulfate salt.

5. The composition produced by the method of claim 4 which has a total plant nutrient content between about 36 and 45 weight percent, a nitrogen content between about 10 and 33 weight percent; said nitrogen present as nitrate and ammonium; a sulfur content between about 1 and about 15 weight percent, and a calcium content between about 1 and about 20 weight percent.

6. The treatment of claim 4 wherein said calcium sulfate is employed in a quantity sufficient to provide between about 0.1 and 60 percent by weight calcium sulfate in said improved solid composition.

7. The treatment of claim 4 wherein said calcium sulfate is employed in a sufficient quantity to provide from 0.1 to 10 percent by weight of calcium sulfate in said improved solid composition.

8. The method of claim 4 wherein said hydrate of calcium sulfate is powdered gypsum and the temperature of said heating is between about 220° and 262° F.

References Cited by the Examiner

UNITED STATES PATENTS

| | | | |
|---|---|---|---|
| 1,969,980 | 8/1934 | Harvey | 71—64 |
| 2,399,987 | 5/1946 | Cordie et al. | 71—64 |
| 2,857,262 | 10/1958 | Graham | 71—64 |
| 2,867,522 | 1/1959 | Facer | 21—64 |
| 2,926,079 | 2/1960 | Smith | 71—64 |
| 3,014,783 | 12/1961 | Young | 71—64 |
| 3,021,207 | 2/1962 | Stengel | 71—64 |
| 3,027,249 | 3/1962 | Jost | 71—64 |

FOREIGN PATENTS

| | | |
|---|---|---|
| 570,267 | 7/1945 | Great Britain. |
| 800,208 | 8/1958 | Great Britain. |
| 815,829 | 7/1959 | Great Britain. |

DONALL H. SYLVESTER, *Primary Examiner.*

ANTHONY SCIAMANNA, *Examiner.*